United States Patent [19]

Wengeler et al.

[11] 4,181,703
[45] Jan. 1, 1980

[54] METHOD FOR THE TREATMENT OF PHOSPHATE ROCK

[75] Inventors: Wilhelm Wengeler, Bochum-Stiepel; Friedrich Wolstein, Essen; Egbert Hoffmann, Bochum, all of Fed. Rep. of Germany

[73] Assignee: UHDE GmbH, Dortmund, Fed. Rep. of Germany

[21] Appl. No.: 852,918

[22] Filed: Nov. 18, 1977

Related U.S. Application Data

[63] Continuation of Ser. No. 704,436, Jul. 12, 1976, abandoned.

[51] Int. Cl.² ............................................. C01B 25/01
[52] U.S. Cl. ................................................. 423/167
[58] Field of Search ................ 423/167, 319, 320, 321

[56] References Cited

U.S. PATENT DOCUMENTS

| 3,240,559 | 3/1966 | Barr | 423/167 |
|---|---|---|---|
| 3,493,340 | 2/1970 | Bosen et al. | 423/167 |
| 3,556,724 | 1/1971 | Fuchs et al. | 423/167 |
| 3,717,702 | 2/1973 | Petersen | 423/320 |
| 3,795,728 | 3/1974 | Scheel | 423/341 |
| 3,886,259 | 5/1975 | Nikolai et al. | 423/167 |

*Primary Examiner*—O. R. Vertiz
*Assistant Examiner*—Thomas W. Roy
*Attorney, Agent, or Firm*—Wilson, Fraser, Barker & Clemens

[57] ABSTRACT

The method for the treatment of phosphate rock that has a content of magnesium compounds in excess of 0.3%. The crushed and screened phosphate rock is mixed with water in a ratio of 1:5 by weight. The mixture is acidified with sulphuric acid, and the reaction mixture is filtered and washed before the neutralization point is reached.

6 Claims, 1 Drawing Figure

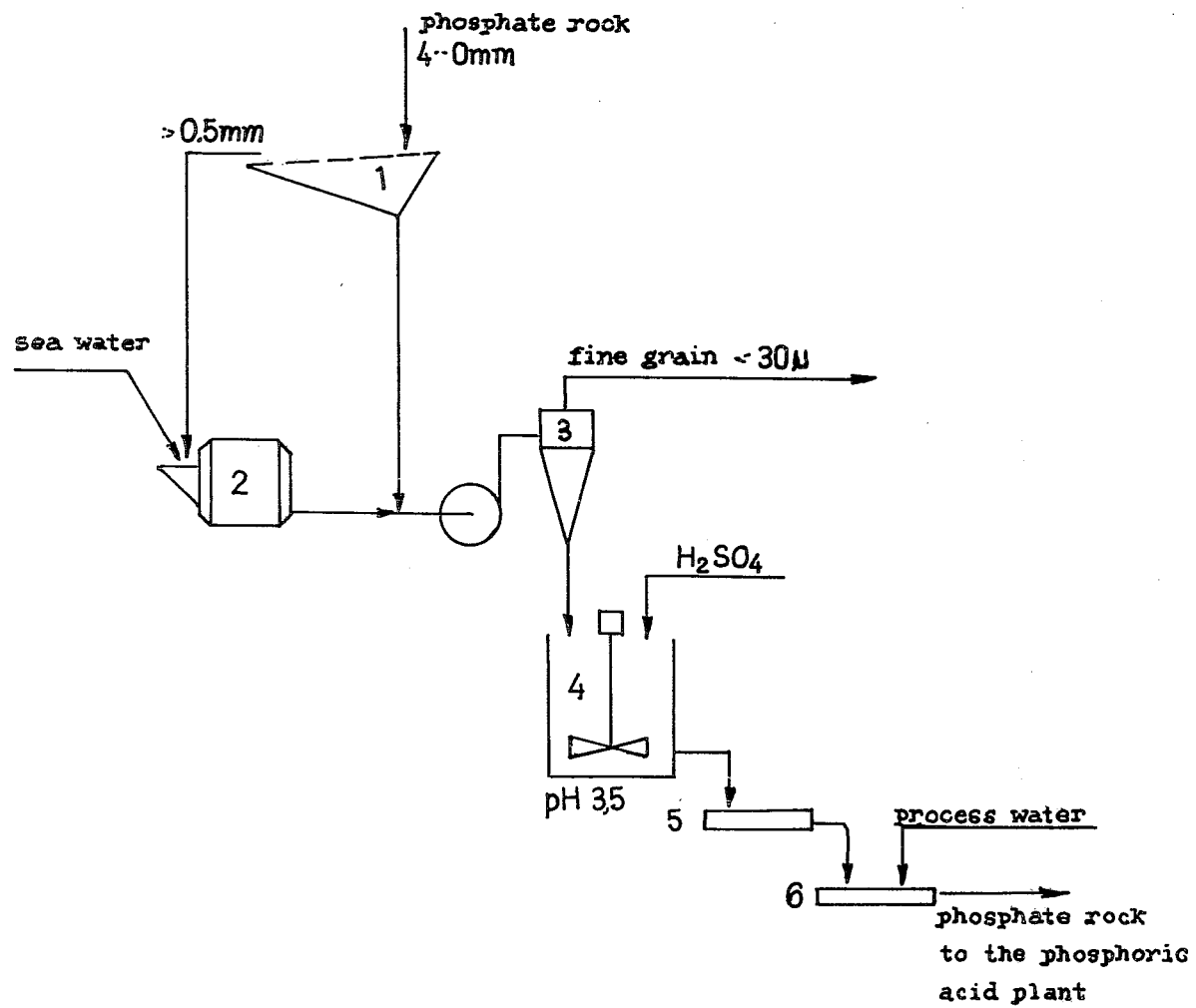

METHOD FOR THE TREATMENT OF PHOSPHATE ROCK

This is a continuation of copending application Ser. No. 704,436, filed July 12, 1976, now abandoned.

BACKGROUND OF THE INVENTION

This invention concerns a method for the treatment of phosphate rock, which has previously been screened, crushed and classified and the grain size of which is smaller than 0.5 mm and larger than 30μ. The main purpose of this process is to reduce the content of magnesium compounds in the phosphate rock. The treated phosphate rock serves as feedstock for the production of phosphoric acid by the wet chemical process.

Phosphate rock is found in nature in the form of apatite mixed with the most varied minerals. One such mineral is dolomite, i.e. a mixture of calcium and magnesium carbonates. Magnesium compounds can also exist in the form of silicates or phosphates.

Magnesium compounds are generally soluble in phosphoric acid. When the phosphate rock is digested by sulphuric acid, for the purpose of producing phosphoric acid, the magnesium compounds are not removed with the by-product gypsum, but instead are dissolved and thus remain in the phosphoric acid. Here, however, they constitute a disturbance factor when, for example, the phosphoric acid is concentrated from 30 to 54% $P_2O_5$. On the other hand, the presence of magnesium compounds in the phosphoric acid is especially detrimental when the acid is used to make fertilizers. Gelatinous magnesium compounds form when the phosphoric acid is being concentrated or during neutralization, and these compounds, in turn, make the concentration of phosphoric acid, because of its increasing viscosity, difficult or impossible. In the manufacture of fertilizer, these compounds have a negative effect, for instance, on the granulation process.

It is known that for this reason, only phosphate rock with a magnesium content of less than 0.3% is normally processed.

U.S. Pat. No. 3,493,340 proposes to process the phosphate rock by calcination, thus converting the carbonates to oxides.

It is known that these magnesium oxides are easily soluble in diluted sulphuric acid, without the calcium phosphate contained in the phosphate rock being dissolved at the same time.

However, if the dolomite, i.e. magnesium and calcium carbonates, is to be dissolved directly by sulphuric acid, then the reaction is impeded by the formation of calcium sulphate, also called gypsum. In addition, it is impossible to filtrate phosphate rock processed in this manner since the minute particles, or gelatinous magnesium compounds, tend to clog the pores of the filter fabric.

SUMMARY OF THE INVENTION

The purpose of this invention is to eliminate the disadvantages of the known processes for the treatment of phosphate rock and also to permit the treatment of phosphate rock that has a content of magnesium compounds that surpasses 0.3%.

According to the present invention, this task is accomplished by mixing the crushed, screened phosphate rock with water in a ratio of 1:5 by weight, acidifying it with sulphuric acid, and by filtering and washing the reaction mixture before the neutralization point is reached.

Since all the phosphate rock to be treated is usually of the same origin and there are only rarely mixed phosphates of different compositions, a further embodiment of the invention provides for limiting the degree of acidification to a definite pH value. It was found, for instance that phosphate rock that contains magnesium and calcium carbonate as its main impurity must be acidified to a pH value of 3.5.

If other magnesium compounds are in the phosphate rock, such as magnesium silicate, then it is advantageous to acidify the phosphate rock up to a pH value of 3.0. In a further embodiment of the invention, the phosphate may be acidified to a pH value of less than 3.0, providing the small quantities of calcium phosphate lost through dissolving are compensated by a considerable reduction of the impurities contained in the phosphate rock. Furthermore, it was found appropriate to mix the phosphate rock with sea water and to acidify the resultant sea water-phosphate rock slurry. This considerably shortens the reaction time of the phosphate rock and the sulphuric acid, since the gypsum formed by the reaction of dolomite and sulphuric acid is soluble in sea water added in the specified ratio of 1:5. Hence, the reaction is not impeded by the formation of a layer of gypsum on the dolomite.

If fresh water is used for this reaction, then it is necessary to increase the ratio of phosphate rock to fresh water in relation to the dolomite content of the phosphate rock.

It is only possible to filter the treated phosphate under certain conditions. Thus, it is necessary to keep the slurry in an acid state so that no gelatinous compounds form that would either make the filtration difficult or impossible. A pH value between 5 and 3 has been shown to be favorable. The interval between acidification and filtration should be as short as possible and it may be necessary to re-acidify the slurry before filtration.

Another characteristic of the new process is the separation of minute particles of the phosphate rock before acidification. If these particles are not separated, filtration will not be possible after acidification.

It is absolutely necessary to separate the excess water from the slurry since otherwise the phosphate rock cannot be used in the associated phosphoric acid plant. This water would prevent the sulphuric acid from attacking the phosphate rock or reduce the rate of digestion and, consequently, the $P_2O_5$ concentration of the product phosphoric acid would be considerably lower.

The particular advantages inherent to this invention are that clean phosphate rock can be obtained by means of a simple process, with the aid of inexpensive auxiliary materials, using normal filtering equipment and without having to introduce thermal energy.

BRIEF DESCRIPTION OF THE DRAWING

In the drawing, the FIGURE is a diagrammatic view of a method for the treatment of phosphate rock according to the invention.

DESCRIPTION OF THE PREFERRED EMBODIMENTS

In the embodiment of the invention shown diagrammatically on the drawing, phosphate rock with a grain size of: 0–4 mm and a content of:

| EXAMPLE | (0) | (4) |
|---|---|---|
| $P_2O_5$ | 20.25% | 25.8% |
| MgO | 1.66% | 1.80% | is fed to screen 1. The portion that has a grain size exceeding 0.5 mm is ground by the wet method in grinding mill 2, using fresh sea water and recombined with the undersize grains from screen 1. Fine grain under 30μ is separated in hydrocyclone 3. Subsequently, the phosphate rock (grain size 0.5–30μ) has the following composition:

| | | |
|---|---|---|
| $P_2O_5$ | 29.9% | 30.6% |
| MgO | 0.73% | 1.02% |

This screened phosphate rock is then treated in vessel 4 with sulphuric acid while adhering to the pH values of:

| pH = | 3.5 | 2.5 |
|---|---|---| and a reaction time

| of | 30 min. | 30 min. |
|---|---|---|

After passing filter 5 and wash 6, the rock phosphate had the following composition:

| | | |
|---|---|---|
| $P_2O_5$ | 29.9% | 30.3% |
| MgO | 0.5% | 0.3% |

More than 30% of the magnesium compounds that were originally present had thus been dissolved. The $P_2O_5$ yield was more than 99.9%.

What we claim is:

1. A non-thermal method for treating phosphate rock containing a phosphoric acid-soluble magnesium compound to reduce the magnesium content of the rock and beneficiate it for further use substantially free of such magnesium compounds, said method comprising:
   (a) reducing said rock to an average grain size of about 30 microns to about 0.5 mm.,
   (b) mixing said grains of phosphate rock with sea water to form a slurry,
   (c) acidifying at ambient temperatures said aqueous slurry with sulfuric acid to an acid pH no more acid than 2.5,
   (d) maintaining said acidified aqueous slurry in an acid pH of about 3 to about 5 to discourage formation of gelatinous compounds, and
   (e) filtering the acidified aqueous slurry before attaining the neutralization point to recover the solid filtrate left by said treated phosphate rock.

2. The method of claim 1 in which said phosphate rock contains more than 0.3% by weight of said magnesium compound.

3. The method of claim 1 in which said phosphoric acid-soluble magnesium compound is selected from the group consisting of dolomite, magnesium carbonate, magnesium silicate, magnesium phosphate, and mixtures thereof.

4. The method of claim 1 in which said mixing of said grains with sea water is in the ratio of about 1:5, respectively.

5. The method of claim 1 in which said phosphoric acid-soluble magnesium compound is substantially magnesium carbonate, and said acidifying at ambient temperatures is to an acid pH of about 3.5.

6. The method of claim 1 in which said phosphoric acid-soluble magnesium compound is substantially magnesium silicate, and said acidifying at ambient temperatures is to an acid pH of about 3.0.

* * * * *